(Model.)

J. WHEELER.
FELLY CLIP.

No. 264,009. Patented Sept. 5, 1882.

WITNESSES:
Francis McArdle.
C. Sedgwick.

INVENTOR:
J. Wheeler
BY Munn & Co.
ATTORNEYS.

United States Patent Office.

JOHN WHEELER, OF DENVER, COLORADO, ASSIGNOR TO HIMSELF AND CHARLES STABERN AND RICHARD W. POMEROY, ALL OF SAME PLACE.

FELLY-CLIP.

SPECIFICATION forming part of Letters Patent No. 264,009, dated September 5, 1882.

Application filed December 31, 1881. (Model.)

*To all whom it may concern:*

Be it known that I, JOHN WHEELER, of Denver, in the county of Arapahoe and State of Colorado, have invented certain new and useful Improvements in Felly and Tire Supporters, of which the following is a full, clear, and exact description.

The invention consists in a metallic device constructed to receive the adjacent ends of the felly-sections of a wagon or other vehicle wheel within it, and to support the felly ends from their inner sides, for the purpose of keeping said ends from bending inward or from splitting, and also, by its construction with extended side flanges, for keeping the tire in its place on the felly.

Reference is to be had to the accompanying drawings, forming part of this specification, in which similar letters of reference indicate corresponding parts in all the figures.

Figure 1:
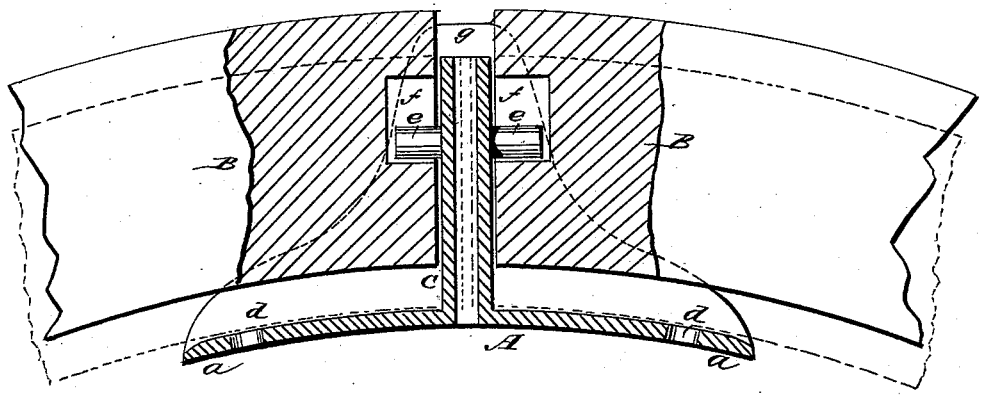
Figure 2:
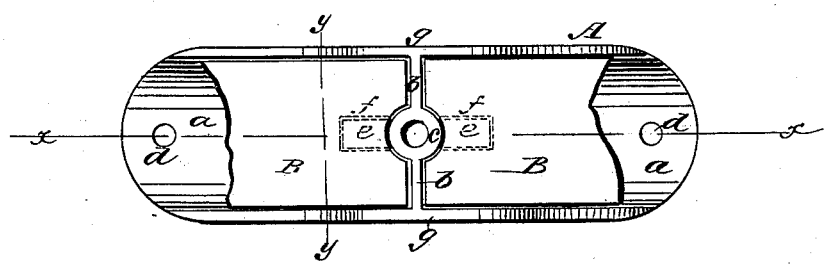
Figure 3:
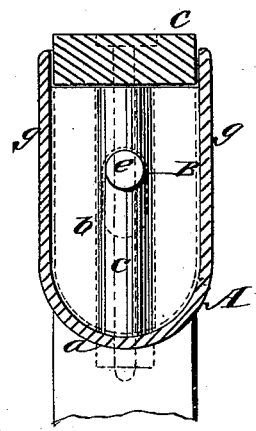

Figure 1 represents a longitudinal vertical section, on the line $xx$ in Fig. 2, of a felly and tire supporter constructed in accordance with the invention, and as applied to support the adjacent ends of two felly-sections. Fig. 2 is a top view of the same; and Fig. 3 is a transverse vertical section, on the line $yy$ in Fig. 2, of like parts, showing also the tire in its place on the felly-sections.

A is the felly and tire supporter, made of malleable cast-iron or any other suitable metal. Said supporter—which may be used either on light or heavy work, and may be of any desired finish or pattern at its ends and other parts to conform to the wheel to which it is designed to be applied—is of a trough-like construction at $a\,a$, to receive within it the end portions of the felly-sections B B, for the purpose of supporting the latter from their inner sides.

The device is strengthened intermediately of its length by a transverse web, $b$, which passes up between the ends of the felly-sections, and may be formed with a central swell or elongated boss, $c$, which enters grooves in said ends. This boss has a hole extended longitudinally through it and through the felly-sustaining back of the supporter for the purpose of receiving a bolt arranged to pass through it and through the tire C, as shown by dotted lines in Fig. 3, to secure the whole firmly together; but this hole and bolt may be omitted, as may also holes $d\,d$ in the end portions of the back or base of the supporter for securing the latter by screws or bolts to the felly-sections. The boss $c$, entering the ends of the felly-sections, also serves to relieve the sides of the supporter from lateral strain and to keep said sections in line with each other. The web $b$ or its boss $c$ may also have dowel-pins $e\,e$ on opposite sides of it for like purposes, said pins entering holes $f\,f$ in the ends of the felly-sections, which holes are of elongated form to provide for the pins working in and along them radially to the wheel; but these dowel-pins may, if desired, also be omitted.

The sides of the supporter A, intermediately of their length, may also be constructed with flanges $g\,g$, arranged to extend outward, so as to receive the tire C within them, and for the purpose of keeping the tire in place; or, where the tire is not required to be so retained, said flanges may be omitted or be foreshortened.

In applying the supporter A it is first set back so that its flanges $g\,g$ will not come quite even with the outside of the felly-sections, as shown by full lines in Fig. 1, and afterward, when the tire is on the wheel and before it is cold, the supporter is brought up to its place, as shown by dotted lines of the felly-sections in same figure.

Having thus fully described my invention, I claim as new and desire to secure by Letters Patent—

1. The combination, with the tire and felly-sections of a wheel, of the felly and tire supporter A, having the transverse web $b$, with median tubular boss $c$, the flanges $g\,g$, extending above said boss, and a bolt extending through said tire and boss and secured by a nut beneath the support A, as shown and described.

2. The combination, with felly-sections having the end holes, $f$, of a felly-socket having the median web $b$, provided with the opposite lateral pins, $e\,e$, as and for the purpose specified.

JOHN WHEELER.

Witnesses:
W. S. LEAVITT,
F. H. YOUNG.